A. L. BUHRMEISTER.
TIRE REMOVING AND REPLACING TOOL.
APPLICATION FILED NOV. 15, 1916.

1,260,634.

Patented Mar. 26, 1918.
2 SHEETS—SHEET 1.

WITNESSES:
Lincoln Johnson
Thos. Oastberg

INVENTOR
August L. Buhrmeister
BY Strong & Townsend
ATTORNEYS

A. L. BUHRMEISTER.
TIRE REMOVING AND REPLACING TOOL.
APPLICATION FILED NOV. 15, 1916.
1,260,634.
Patented Mar. 26, 1918.
2 SHEETS—SHEET 2.
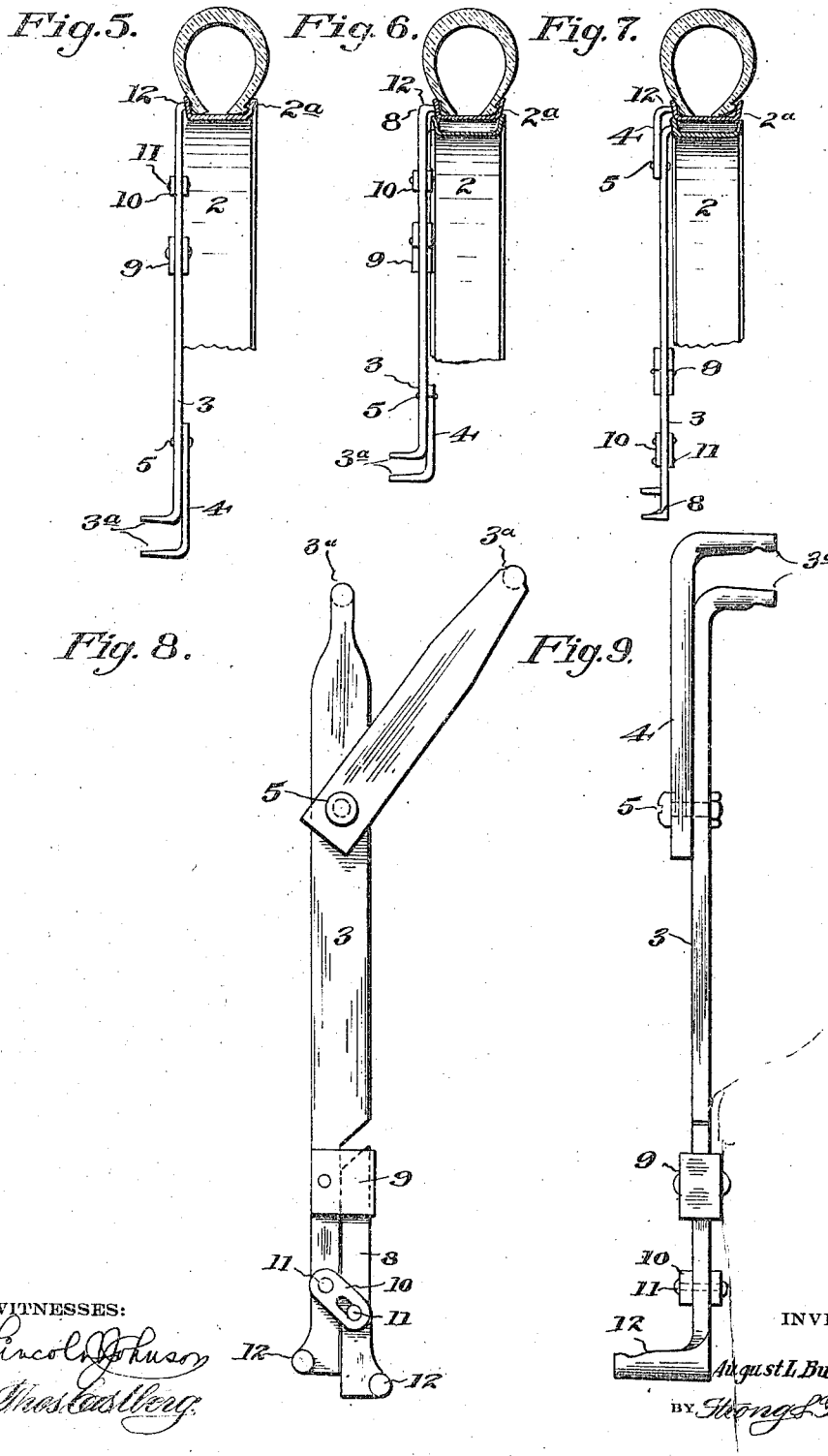

UNITED STATES PATENT OFFICE.

AUGUST L. BUHRMEISTER, OF SUISUN, CALIFORNIA.

TIRE REMOVING AND REPLACING TOOL.

1,260,634.

Specification of Letters Patent. Patented Mar. 26, 1918.

Application filed November 15, 1916. Serial No. 131,556.

*To all whom it may concern:*

Be it known that I, AUGUST L. BUHRMEISTER, a citizen of the United States, residing at Suisun, in the county of Solano and State of California, have invented new and useful Improvements in Tire Removing and Replacing Tools, of which the following is a specification.

This invention relates to a device which is useful for the purpose of removing or replacing the supplemental rims upon which pneumatic tires of automobiles are mounted, said rims being themselves detachably mounted upon metal tire rims which are fixed to the wheel felly, and which have outwardly projecting flanges within which the supplemental rims are retained when in use.

The invention consists in a combination of co-acting pivoted and slidable lever irons having lugs which are adapted to engage with a supplemental rim and contract it so that the tire which it carries may be lifted from or replaced in the rim.

It also comprises details of construction which will be more fully explained by reference to the accompanying drawings, in which—

Figs. 5, 6 and 7 are transverse sections of the tire and rim, and edge views of the tool in position.

Figs. 8 and 9 are enlarged side and edge views of the tool.

Figure 1:
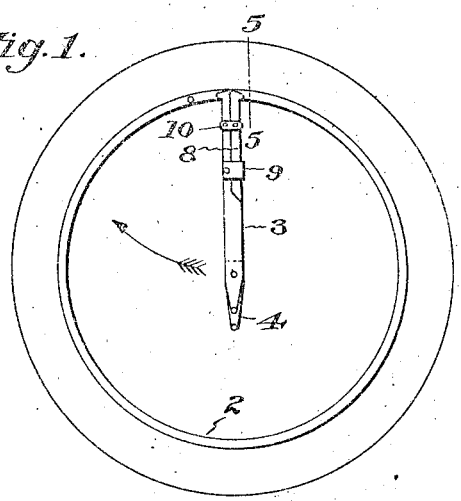
Figure 1 is a view of the tool closed.
Figure 2:
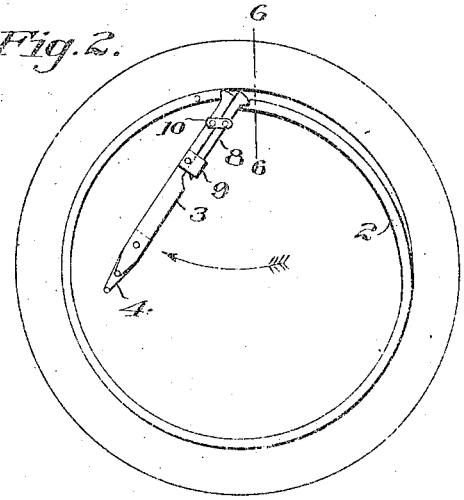
Fig. 2 shows the tool engaged to separate and lift the rim.
Figure 4:
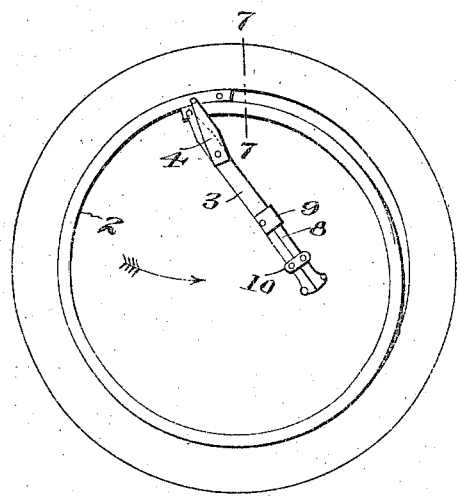
Figs. 3 and 4 show the application of the opposite end and the pivoted lever.
Figure 3:
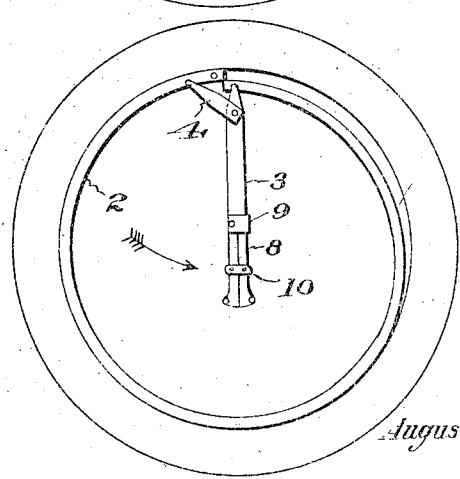

Upon the felly of a wheel is permanently fixed a rigid rim having outwardly turned flanged edges to which the rim 2 is removably secured by various devices, not here shown. This rim 2 is separated at one point, and has outwardly turned flanges 2ª, which when in place with the rim closed serve to clamp and secure the pneumatic tread tire, the flanged shoulders of which are pressed outward against the flanges 2ª, when the tire is inflated, and is thus retained in position.

In order to remove a tire, the detachable rim is removed from the wheel and the tire may be deflated and with the casing may be removed together, by the use of the tool which consists of a main lever bar 3, and a shorter arm 4 is pivoted to the main bar at 5.

The opposite end of the lever bar 3 is reduced in width and a short slidable bar 8 is guided by a strap 9 fixed to the bar, and is connected with the bar near the outer end, by slotted links 10 and pins 11, which allow of a sliding movement of the bar 8. The adjacent ends of the bars 3 and 8 have outwardly turned lugs 12 which are adapted to engage with holes in the rim 2. The operation of detaching the rim is then as follows: The tread casing being contained in the rim 2, and the meeting ends of the latter abutting, the first action is to separate the abutting ends of the rim 2. This is effected by engaging the lugs 12 with the holes in the rim next adjacent the split of the rim, and by thus turning the lever arm 3 to one side the slide 8 will be moved outwardly about the other lug 12 as a fulcrum, and one end of the rim will be lifted out of its abutting position and will then rest above the companion end.

The tool is then removed and the lugs 3ª upon the lever arm 4 and upon the adjacent end of the lever 3 are engaged with the holes in the rim and, when the lever arm is turned to one side the pull exerted by the two levers, will cause the overlapping ends of the rim to slide past one another, and so contract the rim that the tire may be easily removed.

When a tire is to be put on or replaced, the lever arms 3 and 4 are first engaged with the holes in the free ends of the rim and the rim is contracted until the tire can be put on. The tool is then reversed and the lugs 12 are engaged with the holes in the ends of the rim, and these ends are forced apart until they will pass, and assume the abutting position, and tension brought upon the tire to hold it in place. The rim may then be applied and secured to the wheel.

Having thus described my invention, what I claim and desire to secure by Letters Patent is—

1. A tire removing and replacing tool comprising a lever, and a member guided and slidable upon and parallel with one end of the lever and having parallel pin studs projecting from one side, said studs being adapted to engage and deflect the tire holding rim.

2. As a new article of manufacture, a tool for removing tires from rims including a rim-engaging member, rim-engaging means borne by the member whereby when the latter is swung the rim diameter will be increased or decreased and other means borne by the member to engage the rim at a point spaced from the point at which the first named means engaged the rim whereby when the member is again swung the rim diameter will be further increased or decreased.

3. In a tire removing and replacing tool, a lever arm having a portion at one end made narrower than the remainder, a short bar member slidable on the reduced portion, a guide strap fixed to the lever in which the inner end of the slide is movable, links, one end of which are pivoted to the lever, and the opposite ends slotted and movable on a pin passing through the slidable member between the guide and the end of said member, and parallel separated studs projecting from the ends of the lever and the slidable member.

4. In a tire removing tool of the character described, a lever reduced in width at one end, a short member, guided and slidable upon said reduced end, links pivoted at one end to the lever guiding connections between the links and the slidable member, the extreme ends of the lever and the sliding member being diverged and having parallel studs projecting from the diverged portions.

5. In a tool for removing tires from demountable rims, a single bar having spaced lugs to engage in holes formed therefor in one of the split rim ends, means borne by the bar to engage in a hole in the other rim end to increase or decrease the rim diameter, and means borne by the bar to engage in a hole in the other rim end farther from the split than said first hole of the other rim end to further increase or decrease the rim diameter.

In testimony whereof I have hereunto set my hand in the presence of two subscribing witnesses.

AUGUST L. BUHRMEISTER.

Witnesses:
 JOHN H. HERRING,
 W. W. HEALEY.